Dec. 29, 1953     W. H. FRAZEL     2,664,286
APPARATUS FOR DETERMINING WEIGHT OF MATERIAL ON CONVEYERS
Filed April 8, 1947     3 Sheets-Sheet 1

Wilbur H. Frazel
INVENTOR

BY E. C. Sanborn
ATTORNEY

Dec. 29, 1953 W. H. FRAZEL 2,664,286
APPARATUS FOR DETERMINING WEIGHT OF MATERIAL ON CONVEYERS
Filed April 8, 1947 3 Sheets-Sheet 2

Wilbur H. Frazel
INVENTOR

BY E. C. Sanborn
ATTORNEY

Dec. 29, 1953

W. H. FRAZEL 2,664,286

APPARATUS FOR DETERMINING WEIGHT OF MATERIAL ON CONVEYERS

Filed April 8, 1947

Wilbur H. Frazel
INVENTOR

BY E. C. Sanborn
ATTORNEY

Patented Dec. 29, 1953

2,664,286

UNITED STATES PATENT OFFICE 2,664,286

APPARATUS FOR DETERMINING WEIGHT OF MATERIAL ON CONVEYERS

Wilbur H. Frazel, Warren, R. I., assignor to B-I-F Industries, Inc., a corporation of Rhode Island Application April 8, 1947, Serial No. 740,176

22 Claims. (Cl. 265—28)

This invention relates to apparatus for weighing material, and more especially to determining the weight of material.

An object of the invention is to provide novel, efficient and advantageous mechanism applicable to the accurate determination of weights of material on a continuously moving conveyor. In that connection, the invention includes novel weight-responsive means simple in construction and highly precise in operation.

The invention further provides new and efficient means for compensating for varying weight on a conveyor and for any weights of material carried on the return run thereof.

Another and more specific feature of the invention resides in the provision of fluid-pressure responsive means for obtaining especially accurate determination of weights under the control of the weight-sensitive means.

A further feature comprises provisions for the particularly precise integration of conveyor loads.

Other features and advantages of the invention will be hereinafter described and claimed.

Figure 1:
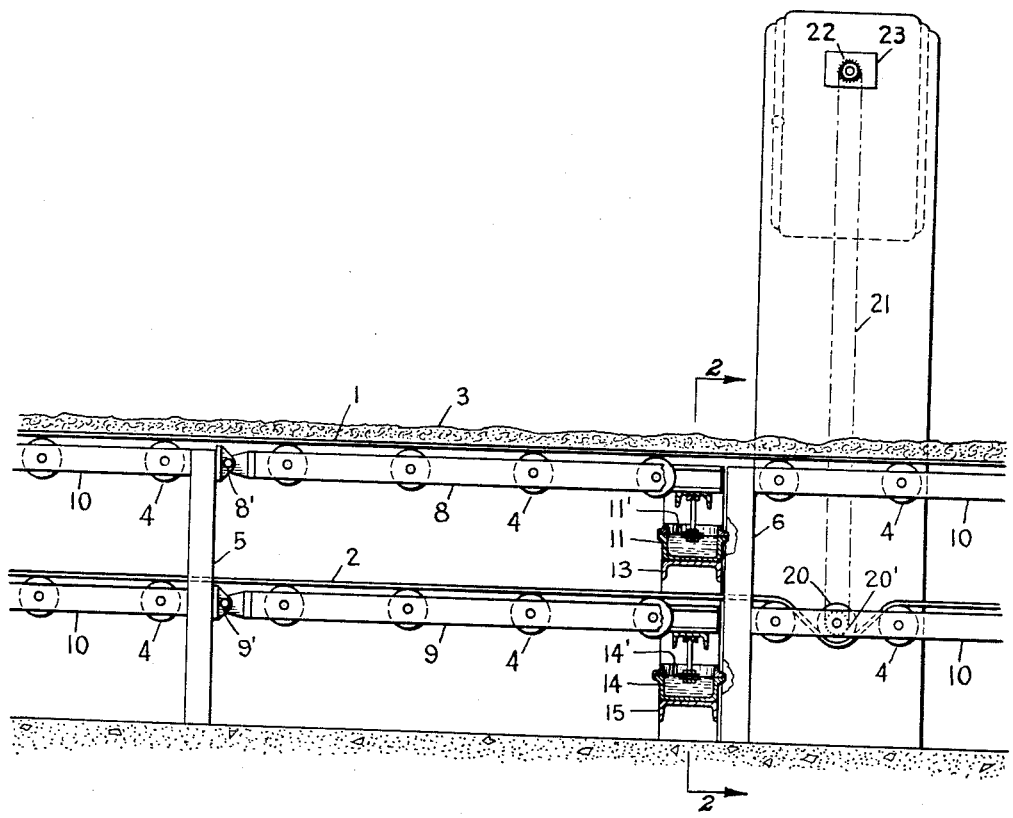
Fig. 1 is a view in front elevation, with parts in vertical section, illustrating an embodiment of the invention.

Referring to the drawings, there are shown at 1 and 2 portions of the upper and lower runs, respectively, of a continuously traveling endless belt, the upper run of which conveys desired material 3 to a point of delivery. The upper and lower runs of the belt are supported by rollers 4 mounted in a suitable frame work, comprising stationary posts and roller-carrying spanner members between said posts.

Figure 2:
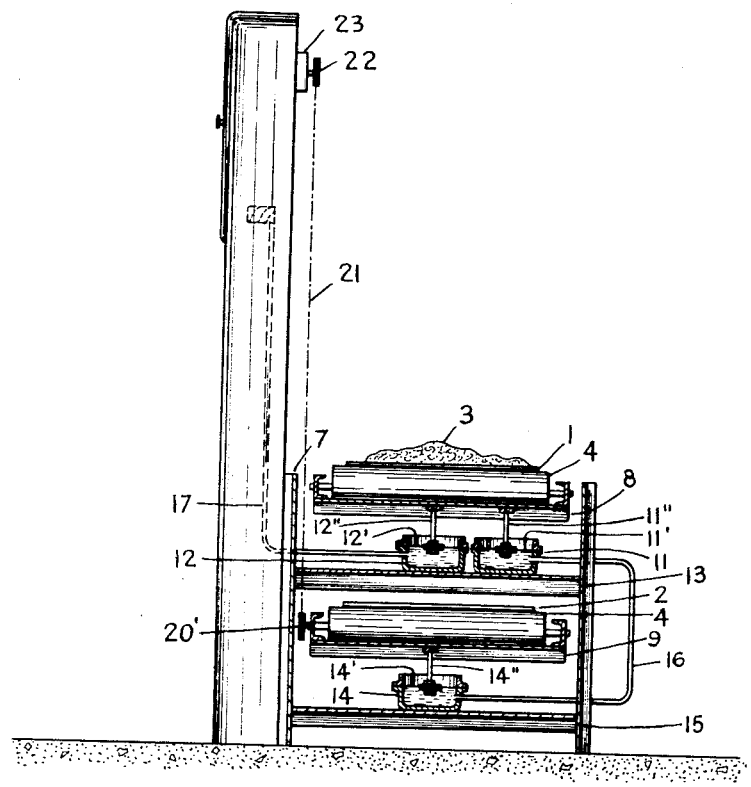
Fig. 2 is a view taken on line 2—2 of Fig. 1.

In Figs. 1 and 2, three posts, designated 5, 6, and 7 are shown, the post 7 being behind the post 6. It will be understood that a fourth post (not shown) corresponding to the post 7 in Fig. 2, is positioned behind the post 5 in Fig. 1. Between this group of four posts are positioned the roller-carrying spanner members 8 and 9. These spanner members 8 and 9 are each pivoted at one end to the post 5 and the corresponding post immediately behind the same. Thus, the upper member 8 may swing in a vertical plane about the pivot 8', and the lower member 9 about the pivot 9'.

Roller-carrying spanner members 10 are also provided for the upper and lower runs of the belt in each of the other sections of the frame work. Each of said members 10, however, may be rigidly secured to the adjacent framework posts.

At its free end, i. e., the end opposite its pivot 8', the spanner member 8 is supported on a pair of diaphragm units 11 and 12; both of which are mounted on a cross-bar 13 rigidly secured to the posts 6 and 7. The free end of the spanner member 9 is supported on a diaphragm unit 14 which is carried by cross-bar 15 rigidly secured to said posts 6 and 7.

The diaphragm unit 11 comprises a receptacle having a diaphragm 11' extending across its interior. The portion of the receptacle beneath said diaphragm contains any suitable fluid under pressure, either liquid or gas. A stem 11" attached to the diaphragm extends upwardly therefrom into engagement with the under side of the spanner member 8. Similarly, a stem 12" attached to diaphragm 12' in receptacle 12 is engaged with the under side of said member 8. The free end of said member is, in short, supported through the stems 11" and 12" of the respective diaphragms 11' and 12', and thence by the fluid beneath said diaphragms.

Likewise, the free end of the spanner member 9 is supported on the stem 14" of diaphragm 14' in receptacle 14, and thence by the fluid beneath that diaphragm.

The diaphragm units 11 and 14 are connected by tubing 16. Said units and tubing comprise a fluid pressure-transmission system.

A tube 17 leads from the diaphragm unit 12 to a Bourdon tube 18 (Fig. 3) or any other suitable pressure-sensitive element deflectable in proportion to the fluid pressure applied thereto. The diaphragm unit 12, tubing 17, and Bourdon tube 18 constitute a second fluid pressure-transmission system.

Disregarding for the moment the diaphragm unit 11, and assuming the free end of the spanner member 8 to be supported only by the diaphragm unit 12, the fluid pressure under the diaphragm 12' will be proportional to the weight resting on the stem 12". Assuming constant weight of the belt and of the spanner member 8, changes in the fluid pressure under said diaphragm 12' will be a measure of the loading on the belt. Over a period of time, the average pressure under said diaphragm, above the pressure under said diaphragm with no load on the belt, will be a measure of the average load carried by the belt during that period of time; and, when properly correlated with the speed of the belt during said time period, said pressure may be used to determine the actual weight of material passed over said member 8.

The weight of the belt, however, may vary with wear, changes in atmospheric conditions, etc. Also, material carried by the belt may adhere thereto in varying amounts and be returned by the lower run of the belt to be carried across the member 8 more than once. Hence the average pressure under the diaphragm 12′ over a given period of time may not be a true measure of the weight of the material actually delivered. Through the provision of the diaphragm units 11 and 14, however, accurate measurement of the material delivered by the upper run of the belt is assured.

More particularly, it will be noted that the weights of the lower spanner member 9, the section of the belt carried thereby, and adhering material associated with said belt section, create a corresponding pressure under the diaphragm 14′. This pressure reacts on the diaphragm 11′, the effective area of which is the same as that of the diaphragm 14′, to create a force upward on the free end of the spanner member 8 proportional to the weight pushing downward on the diaphragm stem 14″. In other words, the weight supported by the diaphragm unit 14 is subtracted from the total weight of the member 8 with its associated belt and load, so that changes in pressure under the diaphragm 12′ represent net weight of material; and, over a period of time, the average pressure under the diaphragm 12′ is a true measure of the average load carried by the belt during that period.

Since the speed of travel of the belt may not be constant, it is desirable to integrate the weight of material with respect to the actual belt speed. For that purpose, a roller 20 is driven by the belt, and through sprocket 20′, chain 21, and sprocket 22 drives an integrator mechanism 23 later to be described.

If compensation is desired for the effect upon the Bourdon tube 18 of changes in volume of the liquid in the unit 12 and tube 17 due to ambient temperature variations, it will readily be seen that the fluid pressure systems above described lend themselves readily to such compensation. This is a matter of appropriately sizing the diaphragms 11′ and 14′ with respect to diaphragm 12′, and dimensioning the volume of the fluid system 11—16—14 with respect to that of the unit 12, tube 17, and Bourdon tube 18.

More particularly, it will be noted that if the total movement of the two diaphragm stems 11″ and 14″ be twice that of the diaphragm stem 12″, changes in volumes of the fluid in the two diaphragm systems will have no effect upon the accuracy of response of the Bourdon tube 18 or other pressure sensitive element. Assume, for example, that the effective area of the diaphragm 12′ and the volume of fluid in the receptacle 12, connecting tube 17, and Bourdon tube 18, be such that a 10° increase in temperature will cause the rod 12′ to rise .001″. Assume also, for example, that the areas of the diaphragms 11′ and 14′, and the volume of fluid in their receptacles 11 and 14, and connected tubing 16, is such that for a 10° increase in temperature the total rise of the two stems 11″ and 14″ is .002″. Each of said stems 11″ and 14″ will then rise .001″ under said temperature change; wherefore the stem 12″ can rise .001″ without any increase in pressure under its diaphragm 12′, and with consequent lack of interference with the proper setting of the Bourdon tube 18.

Thus the desired result may be achieved by appropriately relating the diaphragm areas and fluid volumes of the two systems to each other. If, for instance, the effective areas of the respective diaphragms 11′, 12′, and 14′ are equal to each other, and the volumes of the respective receptacles 11, 12, and 14 are also equal to each other, compensation for temperature is readily attained by making the volume of the tubing 16 twice the total volume of the tubing 17 and the Bourdon tube connected thereto.

As above pointed out, the sprocket wheel 22 of the integrator mechanism 23 is rotated by the movement of the conveyor belt, through roller 20, at a speed proportional to the rate of travel of said belt. Secured to the shaft of said sprocket 22 is a conventional integrator disk 24 (Fig. 3), engaged by the customary integrating wheel 25. The latter is fastened to a sleeve 26 rotatably mounted on suitable end bearings in a carriage 27. Extending through the sleeve 26, and also through the ends of said carriage 27, is a rotatable shaft 28, journaled at its ends on suitable bearings in opposite walls of the housing 29 for the integrator mechanism. The sleeve 26 is keyed or splined to the shaft 28 so that said sleeve is movable with the carriage 27 longitudinally on said shaft; but rotation of said sleeve imparts rotation to said shaft 28. The carriage 27 and wheel 25 are adapted to be drawn to the right in Fig. 3, by a cord 30, in opposition to the action of a spring 31. Said cord is arranged to be controlled by the aforementioned Bourdon tube 18, in accordance with the weight of material on the belt conveyor.

The periphery of the wheel 25 bears against the integrating disk 24, which, as noted above, is rotated at a speed proportional to the speed of travel of the conveyor belt. At zero load on the belt, the wheel 25 is adjusted to be in the exact center of the integrating disk 24, so that no motion is imparted to said wheel by the rotation of said disk. However, with weight added to the belt, the wheel 25 is shifted to the right of the center of said disk by the operation of the cord 30, through a distance proportional to the magnitude of said weight. Since the disk 24 rotates at a speed proportional to the rate of belt travel, the speed of rotation of the wheel 25 is directly proportional to the rate-weight at which material is passing over the spanner member 8.

A totalizer or counter 32 is driven by shaft 28 of the integrating wheel, through gears 33 and shaft 34, to indicate the total amount of material delivered by the conveyor belt.

The control of the cord 30 by the Bourdon tube 18 in accordance with changes in the weight of material on the conveyor belt may be effected in any suitable manner. I have, however, provided an especially efficient control mechanism between said tube 18 and cord 30, wherein the movements of said tube 18 in response to weight changes are sensed pneumatically without imposing appreciable load on said tube, and providing other substantial advantages. A specific embodiment of said control mechanism is illustrated in Fig. 3, and will now be described.

Figure 3:
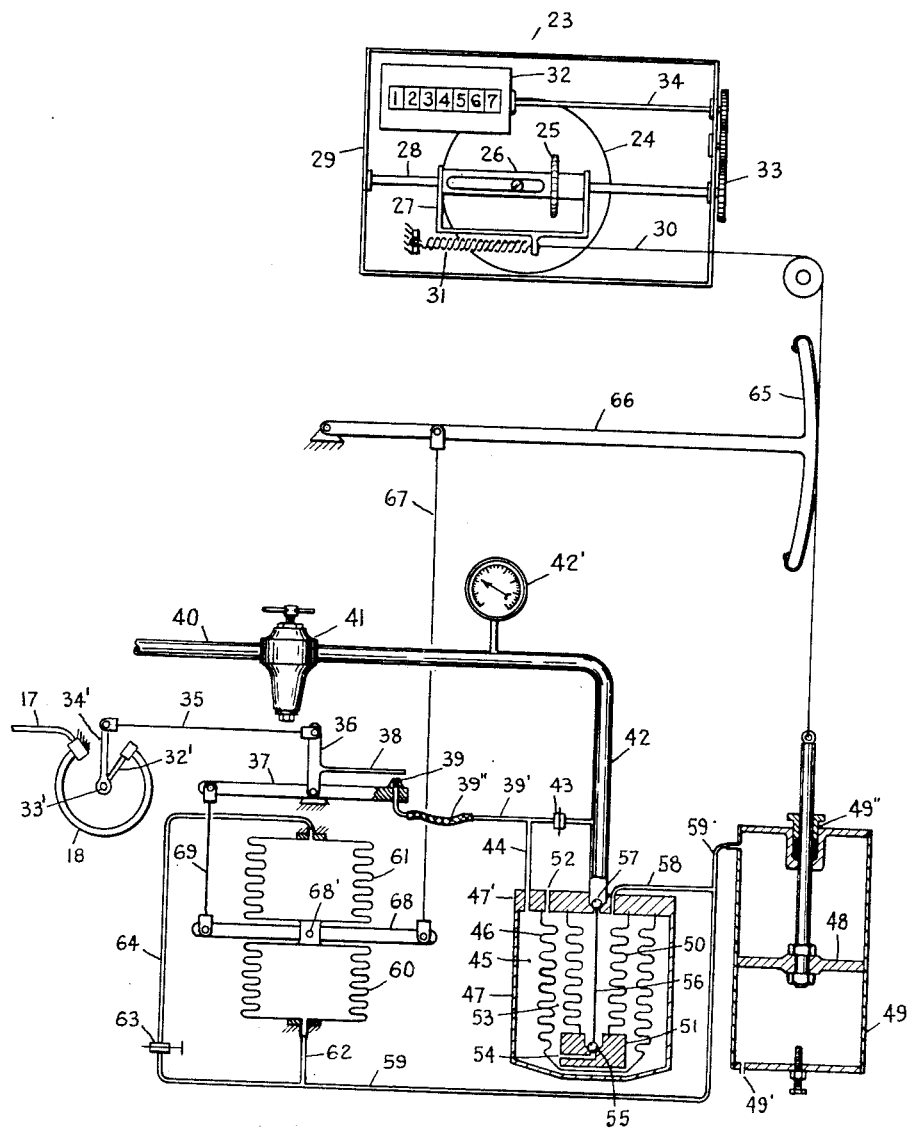
Fig. 3 is a diagrammatic elevational view, with parts in vertical section, of an embodiment of fluid-pressure responsive integrating means controlled by the weight sensitive means.

As shown in Fig. 3, the end of the Bourdon tube, opposite the end connected to the tube 17, is attached to an arm 32′, fast to a shaft 33′. Also secured to said shaft 33′ is a lever arm 34′, which is connected by a link 35 with another lever arm 36, pivoted on a lever 37.

As previously noted, the fluid pressure beneath the diaphragm 12 is excess of the pressure corresponding to tare weight, represents the net weight of the material on the spanner member 8; such pressure will effect movement of the Bourdon tube 18 and its output shaft 33'. Some particular pressure in the weighing diaphragm-Bourdon tube system corresponds to zero flow of material (i. e., no load on the belt); and this pressure causes the output shaft 33' to assume a certain position, which may be designated the zero position. Load on the belt passing over the member 8 will cause higher pressures to be created by the weighing diaphragm 12', the difference between these pressures and the pressure corresponding to zero load being directly proportional to the instantaneous loads on said member 8. Since the position of the output shaft 33 is directly proportional to the pressure acting on the Bourdon tube at any instant, the position of said shaft relative to its zero position will be directly proportional to the loading on the belt.

Extending from the lever arm 36 is a flapper arm or vane 38 which overlies a nozzle 39 in the lever 37, from which air bleeds continuously, except when the flapper may momentarily entirely close the nozzle opening. Air is supplied to said nozzle from a suitable source of supply through a pipe 40, pressure reducing valve 41, pipe 42, and thence through a small orifice or restriction 43. The air pressure in the pipe 42 is indicated by a pressure gauge 42'.

Movement of the flapper 38 with respect to the nozzle 39 results in change in the throttling effect of the flapper on the air issuing from the nozzle, and occasions corresponding changes of pressure in the nozzle pipe 39'. The pipe 39' and nozzle 39 are flexibly connected by a section of tubing 39''.

It will be noted that the Bourdon tube 18 need overcome only the friction of the parts connecting it to the flapper 38, and the extremely small reaction of the nozzle air on the flapper. Since very little work is required of the Bourdon tube, its accuracy of response to small load changes on the spanner member 8 is negligibly affected. At the same time, the flapper-nozzle arrangement is sensitive to extremely small changes in relative position of the one element to the other.

The nozzle pipe 39' communicates, through pipe 44, with a chamber 45 between a bellows 46 and casing 47 of a booster valve arranged to control the pressure to the piston 48 in the power cylinder 49, as will presently be described.

Within the booster valve casing 47 is a second bellows 50, smaller than bellows 46, and soldered to a block 51 which contacts the inner bottom surface of said bellows 46. A bleed hole 52, extending through the top portion 47' of the casing 47, provides communication between the atmosphere and the chamber 53 between the bellows 46 and 50. A passage 54, extending through the block 51, provides communication between the chamber 53 and the interior of the bellows 50, but such communication exists only when ball 55 is off its seat in said block 51. When said ball 55 is on said seat, as shown in Fig. 3, the space inside the bellows 50 is isolated from the chamber 53.

The ball 55 is secured to the lower end of a rigid stem or rod 56, which has affixed to its upper end another ball 57. The ball 57 is adapted to engage a seat in a passage extending through the top casing portion 47' and communicating with the pipe 42.

A pipe 58 communicates at one end with the interior of the bellows 50, and at its other end with pipe 59 which leads to the interior of the upper portion of the piston cylinder 49. The lower end of said cylinder communicates with the atmosphere through opening 49'.

The stem 56 spaces the balls 55 and 57 such a distance apart that for nozzle pressures (i. e., pressures in the pipe 39') below a given amount, say 8½ pounds per square inch, the distance between said balls is less than that between their seats in the block 51 and casing top 47'. Hence, as long as the nozzle pressure is below 8½ pounds per square inch, the upper ball 57 is seated, preventing entrance of supply air to the inside of the small bellows 50; and the lower ball 55 is off its seat, permitting communication of the inside of said bellows 50 with the atmosphere.

Now, assume a gradual approach of the flapper 38 toward the nozzle 39. As this approach takes place, pressure in the nozzle system gradually increases due to the increased throttling effect of the flapper on the nozzle air discharge. When the nozzle system pressure reaches 8½ pounds per square inch, this pressure, acting on the outside of the large bellows 46, will have moved the combination of said large bellows, the small bellows 50, and the block 51 to a position in which the lower ball seat just contacts the ball 55. Said ball 55 now blocks communication of the inside of bellows 50 to atmosphere; while the upper ball 57 remains in its seat, preventing entrance of supply air to the interior of said bellows 50. This is the critical position of the parts of the booster valve.

If, now, the nozzle system pressure increases further, the stem 56 will be raised, and the ball 57 lifted from its seat, so that supply air will be admitted from the pipe 42 to the interior of the small bellows 50, building up pressure therein. This building up of pressure within the bellows 50 will continue until the product of that pressure and the effective area of bellows 50 equals the product of the nozzle system pressure ,in excess of 8½ pounds per square inch, and the effective area of the large bellows 46. When this condition of equality is achieved, the booster valve parts will again be in their critical position, with both ball valves closed.

The effective area of the bellows 46 is much greater than that of the bellows 50. If, for example, the effective area of bellows 46 is ten times as great as that of bellows 50, and the nozzle system pressure increases to 8.6 p. s. i. (0.1 p. s. i. in excess of 8.5 p. s. i.), a pressure of 1 p. s. i. inside the bellows 50 will cause balance; and for a nozzle system pressure of 10 p. s. i. a pressure of 15 p. s. i. inside the small bellows will cause critical positioning of the booster valve parts. If the pressure inside the small bellows 50 is at some positive value above atmospheric and the booster valve is in its critical position, and the nozzle system pressure decreases, unbalance between the forces created by the pressure inside the small bellows 50 and the pressure outside the large bellows 46 will cause the bellows and block combination to move downward, unseating the ball 55, and permitting escape of pressure from the inside of the small bellows to atmosphere until balance again obtains.

The output of the booster valve is taken from the interior of the small bellows 50, through pipe 58, and applied, as above noted, to the piston 48.

It will be seen that the booster valve performs three functions: (1) Nozzle system pressure change is amplified by the ratio of the effective areas of the large and small bellows; (2) the relatively small volumes of air under control of the small restriction 43, the nozzle 39, and the flapper 38, acting through the booster valve, control large volumes of air to the output system, the total volume of which may be so large that direct connection of it to the nozzle system might result in too slow response to changes in flapper position; (3) by causing full pressure change in the output system for a small change in nozzle system pressure, errors due to non-linear characteristics of the nozzle-flapper combination are minimized, since, by adjustment of the balls on the stem and proper relative sizing of the two bellows, a working range on the curve of flapper-nozzle separation against nozzle system pressure may be chosen which will be more nearly linear than if the working range encompasses the entire curve.

The pipe 59, which receives pressure from the interior of the bellows 50, communicates not only with the piston cylinder 49, but also with a pair of stabilizing bellows, 60, 61. Pressure from said pipe 59 is led, through pipe 62, to the interior of the "proportional response" bellows 60; and, through an adjustable restriction 63 and pipe 64, to the interior of the "reset" bellows 61.

The piston 48 is connected to the cord 30 which, as previously described, is attached at one end to the carriage 27 of the integrating mechanism. An increase in booster valve output pressure, caused by an increase in weight on the span 8 and consequent approach of the flapper 38 toward the nozzle 39, will cause movement of the piston 48 downward against the pull of the spring 31 until, theoretically, the effective area of the piston, multiplied by the output pressure of the booster valve, equals the pull of said spring. Practically, however, piston friction, the friction developed in the stuffing box 49″, cable and pulley friction, and non-linearity of the return spring will cause errors in the relation of the piston position to load on the span 8. To eliminate such errors, a follow-up system is provided comprising a follow-up segment 65 on a pivoted arm 66, link 67, differential lever 68, and link 69 connecting said differential lever to the nozzle-carrying lever 37 which pivots about the same axis as the flapper 38. The segment 65 is operated by the cord 30, which may be attached to said segment or engaged frictionally therewith.

Disregarding for the moment the stabilizing bellows 60, 61, and assuming the center pivot 68′ of the differential lever to be fixed, the operation is as follows. An increase in weight on the conveyor belt causes a movement of the flapper toward the nozzle, which results in an increase in nozzle system pressure, causing an increase in booster valve output pressure. The piston 48 moves downward against the pull of the spring 31. This moves the follow-up segment 65 and arm 66 in a clockwise direction, dropping the right end of the differential lever 68 and raising its left end. The nozzle-carrying lever 37 turns in a clockwise direction, tending to move the nozzle away from the flapper until a new position of balance between the flapper and nozzle obtains, whereupon the system comes to rest. The piston 48 will be in a position, relative to its position at zero loading on the belt, directly proportional to the load on the belt. While the rotation of the nozzle-flapper combination may have been appreciable, the net movement of the flapper toward the nozzle will have been very small, only enough to increase the nozzle system pressure sufficiently to create in the power cylinder a pressure sufficient to flex the spring enough so that the nozzle motion through the follow-up system nearly equals the flapper motion. The system works to cause powerful forces to be brought to bear to achieve extremely accurate positioning of the mechanism as dictated by the delicate weight-responsive element (Bourdon tube 18), without imposing appreciable load on that element.

The stabilizing bellows 60, 61 are provided to overcome tendencies of the system toward "hunting," which otherwise might occur under certain conditions.

It will be noted that the two bellows 60, 61 are opposed to each other and are connected to the center pivot 68′ of the differential lever 68. The effective areas of said bellows are equal. Hence, said bellows will maintain said pivot in a definite, neutral, position when the pressures in them are equal, regardless of the actual value of said pressures. The position of the pivot 68′ will change only when the pressures in the two bellows 60, 61 are unequal, and the position of the pivot up or down from this neutral position will be proportional to the difference in pressures in the two bellows. In operation, during a change in output pressure from the booster valve, the response of the proportional bellows 60 is much faster than the response of the piston. Therefore, during a time of load change, the differential lever will momentarily pivot about the point of connection of the link 67 to it, resulting in fast repositioning of the nozzle with respect to the flapper, thereby preventing appreciable overshooting of the nozzle system pressure. As air bleeds through the adjustable restriction 63 the pressures in the two bellows tend to equalize, returning the differential pivot to its neutral position. Coincidentally with the return of the pivot toward its neutral position, the delayed response of the follow-up from the piston movement is felt. To achieve a stable system, it is necessary only to adjust the restriction 63 until the rate of the equalizing effect of bleeding through said restriction is properly timed with the rate at which the follow-up from the piston movement is felt. It should be noted that the stabilizing bellows 60, 61 have effect on nozzle position only during a time of weight change. The final position of the nozzle is ultimately determined only by the piston position through the piston follow-up system.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In combinaiton with a weigh span section comprising a movable upper spanner member for receiving the weight of a loaded section of a conveyor and a movable lower spanner member for receiving the weight of an unloaded section of said conveyor; fluid pressure means cooperating with said upper spanner member for response to the weight of said loaded section, fluid pressure means cooperating with said lower spanner member for response to the weight of said unloaded section, fluid pressure transmitting means connected to the second mentioned fluid pressure means for applying pressure therefrom to the upper spanner member in opposition to the weight thereon, and means positionable by the first mentioned fluid pressure means in accordance with the net weight of material on said loaded section.

2. In combination with a weigh span section comprising a movable upper spanner member for receiving the weight of a loaded section of a conveyor and a movable lower spanner member for receiving the weight of an unloaded section of said conveyor; fluid pressure means cooperating with said upper spanner member for response to the weight of said loaded section, means for deducting the weight of said unloaded section from that of said loaded section, said deducting means comprising fluid pressure means coacting with said lower spanner member for response to the weight of said unloaded section and fluid pressure transmitting means for applying pressure from the last mentioned fluid pressure means to said upper spanner member, and means connected to the first mentioned fluid pressure means for response thereto in accordance with the net weight of material on said loaded section.

3. In combination with a weigh span section comprising a movable upper spanner member for receiving the weight of a loaded section of a conveyor and a movable lower spanner member for receiving the weight of an unloaded section of said conveyor; a receptacle having a chamber for a fluid and a diaphragm in said chamber, means on said diaphragm engageable with said upper spanner member for movement by the weight thereon to vary the pressure of the fluid in said chamber, a second receptacle having a chamber for a fluid and a diaphragm in said chamber, means on the diaphragm of said second receptacle engageable with said lower spanner member for movement by the weight thereon to vary the pressure of the fluid in the chamber of said second receptacle, a third receptacle having a chamber for a fluid and a diaphragm in said chamber, means connecting the last mentioned chamber with the chamber of the second mentioned receptacle, means on the diaphragm of said third receptacle for imparting to said upper spanner member an upward force corresponding to the weight on said lower spanner member, and movable means connected to said chamber of said first receptacle for operation by the fluid pressure therein to positions corresponding to the net weight of material on said loaded section.

4. In combination with a weigh span section comprising a movable upper spanner member for receiving the weight of a loaded section of a conveyor and a movable lower spanner member for receiving the weight of an unloaded section of said conveyor; a fluid pressure chamber having a diaphragm therein, means for transmitting to said diaphragm and thence to the fluid in said chamber a force derived from the weight on said upper spanner member, a pair of fluid pressure chambers in communication with each other, each of said chambers having a diaphragm therein, means for transmitting to the diaphragm in one of said pair of chambers and thence to the fluid therein a force corresponding to the weight on said lower spanner member, means for transmitting a corresponding force upwardly from the diaphragm in the other of said pair of chambers to the said upper spanner member, and a fluid pressure responsive member controlled by the pressure in the first mentioned fluid pressure chamber for movement to positions corresponding to the net weight of materials on said loaded conveyor section.

5. In combination with a weigh span section comprising a movable upper spanner member for receiving the weight of a loaded section of a conveyor and a movable lower spanner member for receiving the weight of an unloaded section of said conveyor; fluid pressure means cooperating with said upper spanner member for response to the weight of said loaded section, fluid pressure means cooperating with said lower spanner member for response to the weight of said unloaded section, fluid pressure transmitting means connected to the second mentioned fluid pressure means for applying pressure therefrom to the upper spanner member in opposition to the weight thereon to deduct the weight of said unloaded section from the weight of said loaded section of said conveyor, means responsive to the difference between the weights of said sections, and means operable by said responsive means to positions corresponding to the weights of material on said loaded section.

6. In combination with a weigh span section comprising a movable upper spanner member for receiving the weight of a loaded section of a conveyor and a movable lower spanner member for receiving the weight of an unloaded section of said conveyor; fluid pressure means cooperating with said upper spanner member for response to the weight of said loaded section, fluid pressure means cooperating with said lower spanner member for response to the weight of said unloaded section, fluid pressure transmitting means connected to the second fluid pressure means for applying pressure therefrom to the upper spanner member in opposition to the weight thereon to deduct the weight of said unloaded section from the weight of said loaded section of said conveyor, fluid pressure responsive means connected to the first mentioned fluid pressure means for response in accordance with the difference between the weights of said sections, and means operable by said fluid pressure responsive means to positions corresponding to the weights of material on said loaded section.

7. In combination with a weigh span section comprising a movable upper spanner member for receiving the weight of a loaded section of a conveyor and a movable lower spanner member for receiving the weight of an unloaded section of said conveyor; fluid pressure means cooperating with said upper spanner member for response to the weight of said loaded section, fluid pressure means cooperating with said lower spanner member for response to the weight of said unloaded section, fluid pressure transmitting means connected to the second fluid pressure means for applying pressure therefrom to the upper spanner member in opposition to the weight thereon to deduct the weight of said unloaded section from the weight of said loaded section of said conveyor, means responsive to the difference between the weights of said sections, means operable by said responsive means to positions corresponding to the weights of material on said loaded section, and means for continuously integrating said weights of material.

8. In combination with a weigh span section comprising a movable upper spanner member for receiving the weight of a loaded section of a conveyor and a movable lower spanner member for receiving the weight of an unloaded section of said conveyor; weight-responsive means between said spanner members for supporting the upper member, weight-responsive means below the lower spanner member for supporting said lower member, means connecting the second mentioned weight-responsive means with the upper spanner member for applying upwardly thereto a force corresponding with the weight on said second mentioned weight-responsive means to balance an unloaded section of the conveyor against a loaded section overlying said upper spanner member, a movable element, and means connecting said element to the first mentioned weight-responsive means for movement only when a change in net weight on said loaded section occurs.

9. In combination with a weigh span section comprising a movable upper spanner member for receiving the weight of a loaded section of a conveyor and a movable lower spanner member for receiving the weight of an unloaded section of said conveyor; weight-responsive fluid-pressure means between said spanner members for supporting the upper member, weight-responsive means below the lower spanner member for supporting said lower member, means connecting the second mentioned weight-responsive means with the upper spanner member for applying upwardly thereto a force corresponding with the weight on said second mentioned weight-responsive means to balance an unloaded section of the conveyor against a loaded section overlying said upper spanner member, a movable element, and means connecting said element to the first mentioned weight-responsive means for movement only when a change in net weight on said loaded section occurs.

10. In combination with a weigh span section comprising a movable upper spanner member for receiving the weight of a loaded section of a conveyor and a movable lower spanner member for receiving the weight of an unloaded section of said conveyor; weight-responsive fluid-pressure means between said spanner members for supporting the upper member, weight-responsive fluid-pressure means below the lower spanner member for supporting said lower member, fluid-pressure transmitting means connecting the second mentioned weight-responsive means with the upper spanner member for applying upwardly thereto a force corresponding with the weight on said second mentioned weight-responsive means to balance an unloaded section of the conveyor against a loaded section overlying said upper spanner member, a movable element, and means connecting said element to the first mentioned weight-responsive means for movement only when a change in net weight on said loaded section occurs.

11. In combination, an endless conveyor, a framework for supporting said conveyor, a hinged span in said framework underlying a load-delivery run of said conveyor, a hinged span in said framework underlying the return run of said conveyor, weight-responsive means for supporting the first span, means responsive to the weight on the second span for exerting a corresponding force upwardly against the first span, and means controlled by the first mentioned weight-responsive means for operation to positions corresponding to the load on said conveyor above said first span.

12. In combination, an endless conveyor, a framework for supporting said conveyor, a hinged span in said framework underlying a load-delivery run of said conveyor, a hinged span in said framework underlying the return run of said conveyor, weight-responsive means for supporting the first span, fluid pressure means responsive to the weight on the second span for exerting a corresponding force upwardly against the first span, and means controlled by the first mentioned weight-responsive means for operation to positions corresponding to the load on said conveyor above said first span.

13. In combination with a weigh span section comprising a movable upper spanner member for receiving the weight of a loaded section of a conveyor, and a movable lower spanner member for receiving the weight of an unloaded section of the conveyor; fluid-pressure means cooperating with said lower spanner member for response to the weight of said unloaded section, fluid-pressure transmitting means connected to said fluid-pressure means for applying upwardly to said upper spanner member a force corresponding with the weight on said fluid-pressure means, another fluid-pressure means cooperating with said upper spanner member in response to the net weight of material thereon, and means operable by said net weight responsive means to positions corresponding with said net weight.

14. In combination with a weigh span section comprising a movable spanner member for receiving the weight of a loaded section of a conveyor, means cooperating with said member for developing a fluid pressure commensurate with the weight of material on said conveyor section, a fluid pressure responsive element movable to different positions in accordance with changes in said fluid pressure, fluid pressure varying means controlled by said element, booster valve means controlled by said pressure-varying means for modulating a second fluid pressure, a movable member operable by said second pressure, and means operable by said movable member to positions representative of said weight of material.

15. In combination with a weigh span section comprising a movable spanner member for receiving the weight of a loaded section of a conveyor, means cooperating with said member for developing a fluid pressure commensurate with the weight of material on said conveyor section, a fluid pressure responsive element movable to different positions in accordance with changes in said fluid pressure, nozzle and flapper means controlled by said element to effect variable throttling of a fluid pressure, booster valve means controlled by said nozzle and flapper means for modulating a second fluid pressure in response to a slight change in the throttled pressure, a movable member operable by said second pressure, and means operable by said movable member to positions representative of said weight of material.

16. In combination with a weigh span section comprising a movable spanner member for receiving the weight of a loaded section of a conveyor, means cooperating with said member for developing a fluid pressure commensurate with the weight of material on said conveyor section, a fluid pressure responsive element movable to different positions in accordance with changes in said fluid pressure, pneumatic pressure throttling means controlled by said element, a pneumatically operable member, booster valve means responsive to a slight change in the pneumatic pressure controlled by said throttling means for modulating the pneumatic pressure supplied to said member, and means shiftable by said member to positions representative of said weight of material.

17. In combination with a weigh span section comprising a movable spanner member for receiving the weight of a loaded section of a conveyor, means cooperating with said member for developing a fluid pressure commensurate with the weight of material on said conveyor section, a fluid pressure responsive element movable to different positions in accordance with changes in said fluid pressure, pneumatic pressure throttling means controlled by said element, power means controlled by said throttling means, means shiftable by said power means to positions representative of said weight of material, and follow-up means between said power means and said throttling means.

18. In combination with a weigh span section comprising a movable spanner member for receiving the weight of a loaded section of a conveyor, means cooperating with said member for developing a fluid pressure commensurate with the weight of material on said conveyor section, a fluid pressure responsive element movable to different positions in accordance with changes in said fluid pressure, pneumatic pressure throttling means controlled by said element, power means controlled by said throttling means, means shiftable by said power means to positions representative of said weight of material, follow-up means between said power means and said throttling means, and pneumatic means controlled by said throttling means for stabilizing the action of said throttling means.

19. In combination with a weigh span section comprising a movable spanner member for receiving the weight of a loaded section of a conveyor, means cooperating with said member for developing a fluid pressure commensurate with the weight of material on said conveyor section, a fluid pressure responsive element movable to different positions in accordance with changes in said fluid pressure, pneumatic pressure controlling means comprising a nozzle member and a flapper member, means connecting one of said members with said fluid pressure responsive element for operation thereby, power means controlled by variations in the pneumatic pressure in response to relative change in the position of said members, means shiftable by said power means to positions representative of said weight of material, and follow-up means between said power means and the other of said members.

20. In combination with a weigh span section comprising a movable spanner member for receiving the weight of a loaded section of a conveyor, means cooperating with said member for developing a fluid pressure commensurate with the weight of material on said conveyor section, a fluid pressure responsive element movable to different positions in accordance with changes in said fluid pressure, pneumatic pressure controlling means comprising a nozzle member and a flapper member, means connecting one of said members with said fluid pressure responsive element for operation thereby, power means controlled by variations in the pneumatic pressure in response to relative change in the position of said members, means shiftable by said power means to positions representative of said weight of material, follow-up means between said power means and the other of said members, and pneumatic means responsive to movement of one of said members with respect to the other for operating said other member in a sense to oppose said relative movement.

21. In combination with a weigh span section comprising a movable upper spanner member for receiving the weight of a loaded section of a conveyor and a movable lower spanner member for receiving the weight of an unloaded section of said conveyor; fluid pressure means cooperating with said upper spanner member for response to the weight of said loaded section, fluid pressure means cooperating with said lower spanner member for response to the weight of said unloaded section, other fluid pressure means connected to the second mentioned fluid pressure means for applying upwardly against said upper spanner member a force corresponding to the weight on said second mentioned fluid pressure means, and means positionable by said first-mentioned fluid pressure means in accordance with the net weight of material on said loaded section, the volume of the second mentioned fluid pressure means and said other fluid pressure means connected thereto being so related to that of the first mentioned fluid pressure means as to compensate for changes in fluid pressure volume under changes in temperature.

22. In combination with a weigh span section comprising a movable upper spanner member for receiving the weight of a loaded section of a conveyor and a movable lower spanner member for receiving the weight of an unloaded section of said conveyor; a fluid pressure chamber having a diaphragm therein, means for transmitting to said diaphragm and thence to the fluid in said chamber a force derived from the weight on said upper spanner member, a pair of fluid pressure chambers in communication with each other, each of said chambers having a diaphragm therein, means for transmitting to the diaphragm in one of said pair of chambers and thence to the fluid therein a force corresponding to the weight on said lower spanner member, means for transmitting a corresponding force upwardly from the diaphragm in the other of said pair of chambers to the said upper spanner member, and a fluid pressure responsive member controlled by the pressure in the first mentioned fluid pressure chamber for movement to positions corresponding to the net weight of material on said loaded conveyor section, the fluid volumes and diaphragm areas being so related that a given change in temperature will cause a total movement of the transmitting means of the two last mentioned diaphragms which is twice the movement of the transmitting means of the first mentioned diaphragm.

WILBUR H. FRAZEL.

References Cited in the file of this patent
UNITED STATES PATENTS

| Number | Name | Date |
| --- | --- | --- |
| 1,739,724 | Lake | Dec. 17, 1929 |
| 1,845,437 | Parkhurst | Feb. 16, 1932 |
| 2,145,903 | Tinsley | Feb. 7, 1939 |
| 2,212,085 | Tate | Aug. 20, 1940 |
| 2,371,040 | Fisher | Mar. 16, 1945 |
| 2,394,593 | Christmann | Feb. 12, 1946 |
| 2,422,167 | Hem | June 10, 1947 |